United States Patent [19]

Kreuder et al.

[11] Patent Number: 5,756,623
[45] Date of Patent: May 26, 1998

[54] CYCLOOLEFIN COPOLYMERS AND PROCESSES FOR THEIR PREPARATION

[75] Inventors: Willi Kreuder, Mainz; Frank Osan, Kelkheim, both of Germany

[73] Assignees: Hoechst AG, Germany; Mitsui Petrochemical Ltd., Japan

[21] Appl. No.: 739,926

[22] Filed: Oct. 30, 1996

Related U.S. Application Data

[63] Continuation of Ser. No. 359,565, Dec. 20, 1994, abandoned.

Foreign Application Priority Data

[30]

Dec. 24, 1993 [DE] Germany ............ 43 44 502.0

[51] Int. Cl.$^6$ .................................... C08F 232/08
[52] U.S. Cl. .................. 526/308; 526/281; 526/283; 526/297; 526/300; 526/309; 526/316; 526/348; 526/351; 526/352
[58] Field of Search .................... 526/316, 297, 526/300, 309

[56] References Cited

U.S. PATENT DOCUMENTS

| | | | |
|---|---|---|---|
| 3,240,762 | 3/1966 | Wilks et al. | |
| 3,884,888 | 5/1975 | Collette | 528/28 |
| 3,901,860 | 8/1975 | Collette | 526/261 |
| 4,021,510 | 3/1977 | Weshina | 526/281 |
| 4,104,325 | 8/1978 | Weshina et al. | 526/281 |
| 4,310,637 | 1/1982 | DeWitt | 525/75 |
| 4,614,778 | 9/1986 | Kajiura | |
| 5,003,019 | 3/1991 | Kishimaru | |
| 5,053,471 | 10/1991 | Goto | 526/281 |
| 5,087,677 | 2/1992 | Brekner | |
| 5,179,171 | 1/1993 | Minami | |
| 5,270,393 | 12/1993 | Sagane | 525/210 |
| 5,324,801 | 6/1994 | Brekner | 526/160 |
| 5,371,158 | 12/1994 | Brekner | 526/127 |

FOREIGN PATENT DOCUMENTS

| | | |
|---|---|---|
| 0 074 273 | 3/1983 | European Pat. Off. |
| 0156464 | 10/1985 | European Pat. Off. |
| 0283164 | 9/1988 | European Pat. Off. |
| 0 353 720 | 2/1990 | European Pat. Off. |
| 0407870 | 1/1991 | European Pat. Off. |
| 0 466 279 | 1/1992 | European Pat. Off. |
| 5417931 | 2/1979 | Japan |
| 54-17931 | 9/1979 | Japan |

OTHER PUBLICATIONS

Macromolecules, 20, 258 (1987).
J. March, Advanced Organic Chemistry, Wiley, NY, 1985, Seite 711.
J. March, Adv. Org. Chem., S. 238, Tab. 1.
Recent Advances in the Chemical Modification of Unsaturated Polymers in Rubber Chemistry and Technology, 55, 809, (1982).
European Search Report No. 94119947.3, Jun. 6, 1995.
Derwent Publication, JP-A-63 081 103.

*Primary Examiner*—Fred Zitomer
*Attorney, Agent, or Firm*—Connolly & Hutz

[57] ABSTRACT

Cycloolefin copolymer having a solution viscosity (eta)$\geq$ 0.25 dl/g, A) comprising polymerized units of at least one polycyclic olefin, B) polymerized units of at least one olefin which comprise at least one double bond and, if desired, C) polymerized units of one or more acyclic monoolefins, wherein the equivalent weight with regard to olefinic double bonds is less than or equal to the number-average molecular weight, and which additionally contains at least one repeating unit which possesses at least two electron withdrawing groups. The cycloolefin copolymer is suitable as a coating composition and as an additive.

22 Claims, No Drawings

CYCLOOLEFIN COPOLYMERS AND PROCESSES FOR THEIR PREPARATION

This application is a continuation of application Ser. No. 08/359,565, filed Dec. 20, 1994, now abandoned.

The invention relates to ene-functionalized cycloolefin copolymers (COCs) having a solution viscosity (eta)≧0.25 dl/g and to a process for their preparation.

Nonfunctionalized COCs which contain no double bonds are known (EP 156 464, EP 407 870). These are of high transparency and hardness and of low density. Furthermore, they are virtually inert chemically and are highly resistant to heat deformation. However, nonfunctionalized COCs are of only poor miscibility with other substances, especially polymers, and have poor adhesion properties. In addition to this, they cannot readily be functionalized.

Since these polymers are only accessible via a metal complex-catalyzed polymerization reaction which is known to be intolerant toward polar/reactive groups, the method for the preparation of functionalized COCs by copolymerization of monomers which carry reactive groups, as might be the product of formal reasoning, is not possible.

EP 283 164 discloses COCs which contain cyclic polyenes. These polymers do not have any gel particles and are completely soluble in decalin at 135° C., indicating that they are of substantially linear construction and are non-crosslinked. These polymers can be reacted with maleic anhydride.

The free-radical copolymerization of ethylene with acrylic acid produces ionomers which are marketed under the name SURLYN™ (DuPont). However, these copolymers are of low transparency and also have a relatively low degree of hardness. Ethylene-propylene (EP) copolymers carrying functional groups, which polymers may also comprise one or more diene monomers (EPDM), have also been disclosed ("Recent Advances in the Chemical Modification of Unsaturated Polymers" in Rubber Chemistry and Technology 55, 809 (1982)). JP 54-017,931 describes that EPDM copolymers containing vinylnorbornene as diene monomer are reacted with maleic anhydride. By subsequent reaction with a dye a colored surface coating is obtained. In analogy to this, the reaction of an EPDM containing ethylidenenorbornene as diene monomer with sulfomaleic anhydride is described (Macromolecules 20, 258 (1987)). These materials are, however, elastomers having glass transition temperatures below room temperature.

EP 466 279 A2 describes that maleic anhydride can be grafted, by a free-radical reaction, onto polyolefins which contain bicyclic monomer units. This method is of no industrial significance for a number of reasons: on the one hand the use of compounds which decompose to form free radicals, such as peroxides, is undesirable because of their explosive nature, and on the other hand it is known that such free-radical reactions with polyolefins tend to give rise to secondary reactions which may lead to uncontrolled crosslinking and gelling, and make the final product unusable. Moreover, the funcitional-group contents which can be obtained are only low.

The object was therefore to provide a polymer having good adhesion properties which is readily miscible with other substances, especially polymers, which simultaneously has a high degree of transparency, heat deformation resistance and hardness and a chemically inert and hydrolytically stable polymer backbone, and which can be crosslinked in a controlled manner, and also to provide polymers which not only have the favorable properties mentioned above but also have virtually unlimited storage lives, especially at temperatures above room temperature.

It has now been found that this object can be achieved by the provision of ene-functionalized COCs whose COC framework is synthesized by polymerization in the presence of specific metallocene catalysts. The ene-functionalized COCs according to the invention comprise polymerized units containing functional groups which are introduced by a polymer-analogous ene reaction (c.f. J. March, Advanced Organic Chemistry, Wiley, New York, 1985, page 711; to which reference is hereby expressly made), and differ from the previously known COCs by an improved miscibility with other substances, especially polymers, improved adhesion properties and increased ease of functionalization, making it possible to attach foreign molecules such as, for example, dyes, peptides, enzymes or biocides to the otherwise inert COC, and can be crosslinked in a controlled manner.

In addition, the present invention relates to a process for the preparation of ene-functionalized COCs which operates under industrially advantageous conditions.

The invention therefore relates to an ene-functionalized cycloolefin copolymer which can be crosslinked in a controlled manner, has a solution viscosity (eta)≧=0.25 dl/g (in accordance with DIN 51562 in decalin at 60° C.) and comprises A) polymerized units of at least one polycyclic olefin, B) polymerized units of at least one olefin which comprise at least one double bond and, if desired, C) polymerized units of one or more acyclic monoolefins, wherein the equivalent weight with regard to olefinic double bonds is less than or equal to the number-average molecular weight, and which additionally contains at least one repeating unit which possesses at least two electronwithdrawing groups.

The cycloolefin copolymer according to the invention preferably comprises

A) 0.1–99.89% by weight, based on the total mass of the cycloolefin copolymer, of polymerized units of at least one cycloolefin, B) 0.1–99.89% by weight, based on the total mass of the cycloolefin copolymer, of polymerized units of at least one olefin containing at least one double bond, C) 0–80% by weight, based on the total mass of the cycloolefin copolymer, of polymerized units of at least one acyclic monoolefin, and D) 0.01 to 50% by weight, based on the total mass of the cycloolefin copolymer, of polymerized units which possess at least two electron-withdrawing groups.

The polymerized units A) are preferably derived from cycloolefins of the formulae I, II, III, IV, V, VI and VII

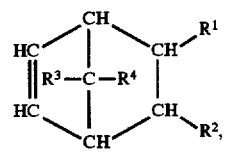

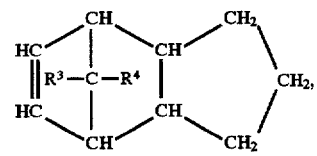

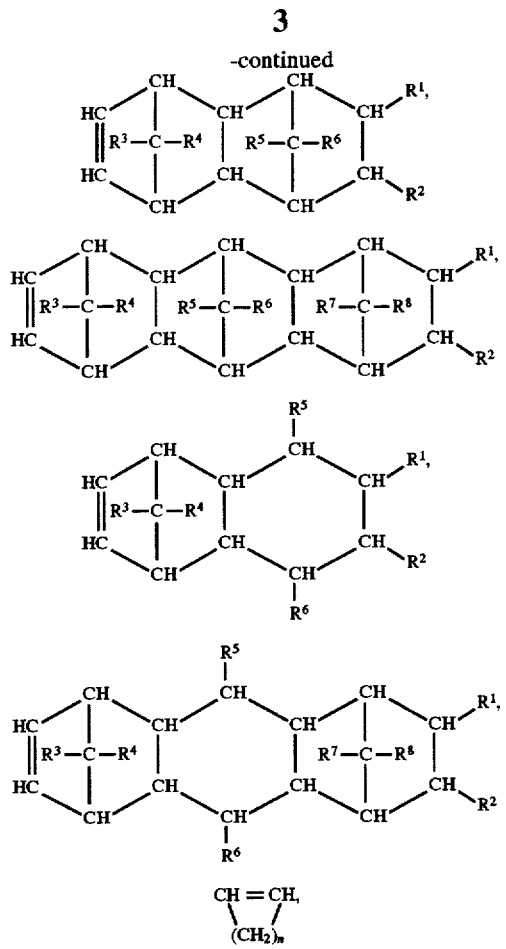

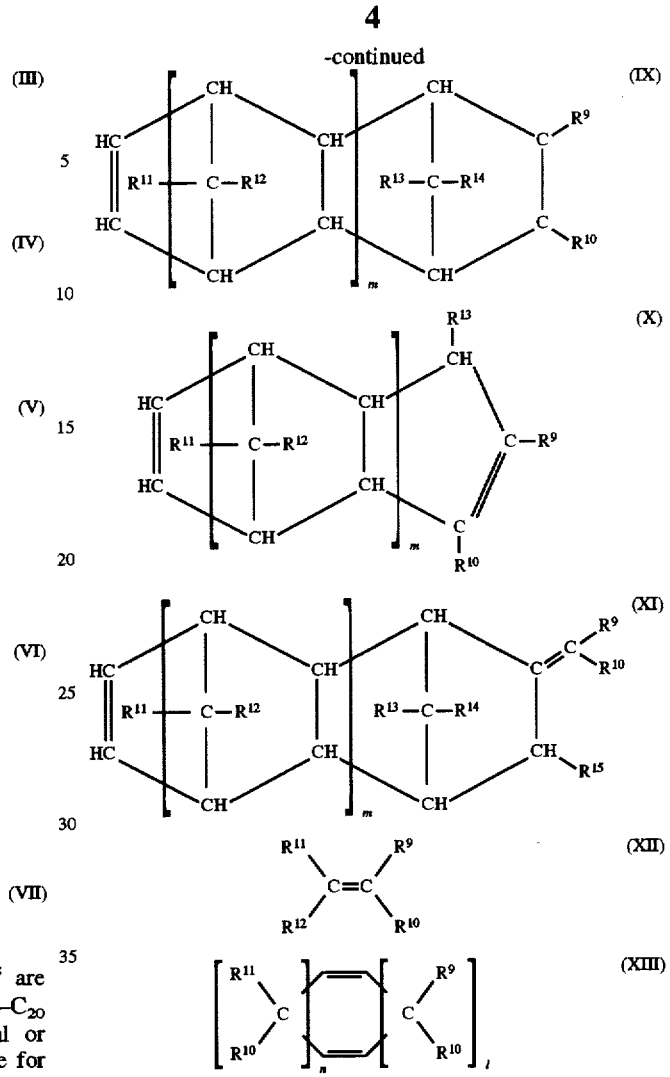

in which the radicals $R^1, R^2, R^3, R^4, R^5, R^6, R^7$ and $R^8$ are identical or different and are a hydrogen atom, or a $C_1$–$C_{20}$ hydrocarbon radical such as a $C_1$–$C_8$-alkyl radical or $C_6$–$C_{14}$-aryl radical, or form a ring, it being possible for identical radicals to have different meanings in the various formulae I to VI, and n is a number from 2 to 10.

Norbornene and tetracyclododecene are particularly preferred.

The polymerized units B) are preferably derived from cyclic and acyclic polyenes, in particular dienes, of 4–20 carbon atoms which contain conjugated and/or nonconjugated double bonds. The double bonds may be at the end in a chain, in a ring (endocyclic) or exocyclic.

Particular preference is given to mono-, di-, tri- or tetracyclic dienes, in particular nonconjugated dicyclic and tricyclic dienes as well as linear or branched acyclic dienes, in particular acyclic dienes having terminal double bonds.

Particular preference is given to polymerized units B) which are derived from compounds of the formulae VIII, IX, X, XI, XII and XIII

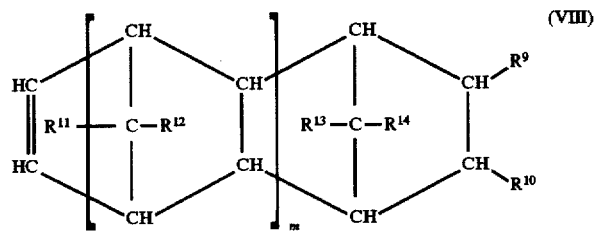

in which $R^9, R^{10}, R^{11}, R^{12}, R^{13}, R^{14}$ and $R^{15}$ are identical or different and are a hydrogen atom, $C_1$–$C_8$-alkyl, $C_6$–$C_{14}$-aryl or $C_3$–$C_{15}$-alkenyl, it being possible for identical radicals to have different meanings in the various formulae VIII–XIII, and at least one of the radicals $R^9, R^{10}, R^{11}, R^{12}, R^{13}$ and $R^{16}$ in formula VIII and $R^9, R^{10}, R^{11}$ and $R^{12}$ in formula XII is a $C_3$–$C_{15}$-alkenyl radical, and m is a number from 0 to 10, and n and l are each a number from 0 to 10, with the proviso that n=l=0 is not true.

Examples of olefins from which the polymerized units B) are derived are cyclodienes such as 2,5-norbornadiene, 5-vinyl-2-norbornene, 5-ethylidene-2-norbornene, 5-methylene-2-norbornene, dicyclopentadiene, 5-isopropylidene-2-norbornene, tricyclopentadiene and 1,4,5,8-dimethano-1,4,4a,5,8,8a-hexahydronaphthalene, cyclopentadiene, 1,4-cyclohexadiene, 1,3-cyclohexadiene, 1,5-cyclooctadiene, 1-vinylcyclohexene, 2-vinylcyclohexene, 3-vinylcyclohexene, alkyltetrahydroindenes such as 4,5,7,8-tetrahydroindenes, 4-methyltetrahydroindenes, 6-methyltetrahydroindenes or 6-ethyltetrahydroindenes, and acyclic dienes such as 1,5-hexadiene, 1,4-hexadiene, 1,3-hexadiene, 1,9-decadiene, butadiene and isoprene.

Diels-Alder reaction products and mixtures of cyclodiene and/or diene can be used, such as the by-products from the preparation of norbornene or tetracyclododecene, which contain a high proportion of di- and tricyclodiene or contain di- and tricyclodiene in the mixture.

In general, acyclic dienes such as 1,5-hexadiene, 1,4-hexadiene, 1,3-hexadiene, 1,9-decadiene, butadiene and isoprene are preferred.

The polymerized units C) are preferably derived from acyclic monoolefins, for example alpha-olefins of 2–20 carbon atoms, especially ethylene and propylene.

Preferred polymerized units D) possess electron-withdrawing groups which exert an -M effect (J. March, Adv. Org. Chem., p. 238, Tab. 1, to which reference is hereby expressly made), especially carbonyl and nitrile, particularly preferably carbonyl.

The polymerized units D) are preferably derived from compounds of the formulae

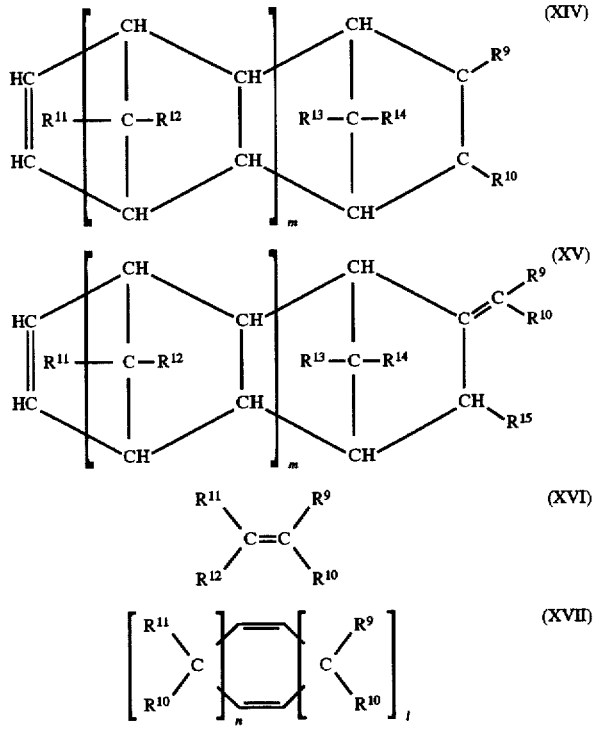

in which the radicals $R^9, R^{10}, R^{11}, R^{12}, R^{13}, R^{14}$ and $R^{15}$ are identical or different and are a hydrogen atom, or a $C_1$–$C_{20}$ hydrocarbon radical such as $C_1$–$C_8$-alkyl, $C_6$–$C_{14}$-aryl or $C_3$–$C_{15}$-alkenyl, it being possible for identical radicals to have different meanings in the various formulae XIV–XVII, m is a number from 0 to 10 and n and l are each a number from 0 to 10, with the proviso that n=0 is not true, and at least one of the radicals $R^9$ and $R^{10}$ is 2,5-dioxotetrahydrofur-3-ylmethyl,
2,3-dicyanopropyl,
2-alkyloxycarbonyl-3-cyanopropyl,
2-aryloxycarbonyl-3-cyanopropyl,
2-cyano-3-alkyloxycarbonylpropyl,
2-cyano-3-aryloxycarbonylpropyl,
2,3-bis(alkyloxycarbonyl)propyl,
2,3-bis(aryloxycarbonyl)propyl,
2-aryloxycarbonyl-3-alkyloxycarbonylpropyl,
2-alkyloxycarbonyl-3-aryloxycarbonylpropyl,
2-alkyloxycarbonyl-3-(N,N-bisalkyliminocarbonyl)propyl,
2-aryloxycarbonyl-3-(N-alkyl-N-aryliminocarbonyl)propyl,
2-carboxy-3-(N,N-bisalkyliminocarbonyl)propyl,
2-carboxy-3-(N-alkyl-N-aryliminocarbonyl)propyl,
3-alkyloxycarbonyl-2-(N,N-bisalkyliminocarbonyl)propyl,
3-aryloxycarbonyl-2-(N-alkyl-N-aryliminocarbonyl)propyl,
3-carboxy-2-(N,N-bisalkyliminocarbonyl)propyl,
3-carboxy-2-(N-alkyl-N-aryliminocarbonyl)propyl,
2,5-dioxotetrahydropyrrol-3-ylmethylene,
N-alkyl-2,5-dioxotetrahydropyrrol-3-ylmethyl,
N-aryl-2,5-dioxotetrahydropyrrol-3-ylmethyl,
N,N'-bis(alkyloxycarbonyl)-2,3-diazapropyl,
4-sulfo-2,5-dioxotetrahydrofur-3-ylmethyl,
4-bromo-2,5-dioxotetrahydrofur-3-ylmethyl,
4-chloro-2,5-dioxotetrahydrofur-3-ylmethyl or
3-sulfo-2,3-bis(alkyloxycarbonyl)propyl, or the salt of one of these compounds with inorganic or organic bases. Salts of inorganic bases are, for example, alkali metal, alkaline earth metal and zinc salts, especially Na, K, Ca and Mg salts. Preference is given to salts of organic bases such as primary and secondary aliphatic amines, for example diethylamine, triethylamine, diethanolamine or triethanolamine.

The polymerized units can also be derived from compounds of the formula (XVIII)

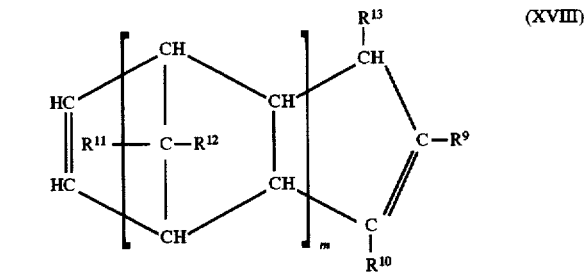

in which the radicals $R^9$, $R^{10}$, $R^{11}$ and $R^{12}$ are identical or different and are a hydrogen atom, or a $C_1$–$C_{20}$ hydrocarbon radical such as $C_1$–$C_8$-alkyl, $C_6$–$C_{14}$-aryl or $C_3$–$C_{15}$-alkenyl, and m is a number from 0 to 10, and $R^{13}$ is 2,5-dioxotetrahydrofur-3-yl,
1,2-dicyanoethyl,
1-alkyloxycarbonyl-2-cyanoethyl,
1-aryloxycarbonyl-2-cyanoethyl,
1-cyano-2-alkyloxycarbonylethyl,
1-cyano-2-aryloxycarbonylethyl,
1,2-bis(alkyloxycarbonyl)ethyl,
1,2-bis(aryloxycarbonyl)ethyl,
1-aryloxycarbonyl-2-alkyloxycarbonylethyl,
1-alkyloxycarbonyl-2-aryloxycarbonylethyl,
1-alkyloxycarbonyl-2-(N,N-bisalkyliminocarbonyl)ethyl,
1-aryloxycarbonyl-2-(N-alkyl-N-aryliminocarbonyl)ethyl,
1-carboxy-2-(N,N-bisalkyliminocarbonyl)ethyl,
1-carboxy-2-(N-alkyl-N-aryliminocarbonyl)ethyl,
2-alkyloxycarbonyl-1-(N,N-bisalkyliminocarbonyl)ethyl,
2-aryloxycarbonyl-1-(N-alkyl-N-aryliminocarbonyl)ethyl,
2-carboxy-1-(N,N-bisalkyliminocarbonyl)ethyl,
2-carboxy-1-(N-alkyl-N-aryliminocarbonyl)ethyl,
2,5-dioxotetrahydropyrrol-3-yl,
N-alkyl-2,5-dioxotetrahydropyrrol-3-yl,
N-aryl-2,5-dioxotetrahydropyrrol-3-yl,
N,N'-bis(alkyloxycarbonyl)-1,2-diazaethyl,
4-sulfo-2,5-dioxotetrahydrofur-3-yl,
4-bromo-2,5-dioxotetrahydrofur-3-yl,
4-chloro-2,5-dioxotetrahydrofur-3-yl or
2-sulfo-1,2-bis(alkyloxycarbonyl)ethyl, or the salt of one of these compounds with inorganic or organic bases. Salts of inorganic bases are, for example, alkali metal, alkaline earth metal and zinc salts, especially Na, K, Ca and Mg salts. Preference is given to salts of organic bases such as primary and secondary aliphatic amines, for example diethylamine, triethylamine, diethanolamine or triethanolamine.

The alkyl radicals in the polymerized units D) may be linear, branched or cyclic, saturated or partially unsaturated, and of 1–18 carbon atoms. The aryl radicals in the polymerized units D) may contain 6–30 carbon atoms and may carry additional substituents, preferably $C_1$–$C_{18}$-alkyl substituents, which independently of one another are linear, branched or cyclic. The polymerized units D) are preferably derived from mixtures of compounds whose components have alkyl and/or aryl radicals with different numbers of carbon atoms. The radicals are derived from homologous series which are industrially available or can be obtained from biological sources without further purification. A preferred source is, for example, a beef tallow alcohol or beef tallow amine mixture whose composition may vary depending on the place of origin, breed and season.

Particularly preferred cycloolefin copolymers are those whose polymerized units B) contain at least 0.1% by weight, in particular 20–60% by weight, based on the total mass of the cycloolefin copolymer, of an acyclic $C_4$–$C_{20}$ polyene, in particular $C_4$–$C_{20}$ diene.

The COC according to the invention has a proportion of polymerized units A) (cycloolefin component) of 0.1–99.89% by weight, preferably 1–99% by weight, particularly preferably 10–90% by weight, based in each case on the total mass of the cycloolefin copolymer.

The proportion of polymerized units B) is 0.1–99.89% by weight, preferably 1–50% by weight, particularly preferably 2–30% by weight, based in each case on the total mass of the cycloolefin copolymer.

The proportion of polymerized units C) is 0–80% by weight, preferably 1–60% by weight, particularly preferably 2–50% by weight, based in each case on the total mass of the cycloolefin copolymer.

The proportion of polymerized units D) which possess at least two electron-withdrawing groups is 0.01–50% by weight, preferably 0.05–20% by weight, particularly preferably 0.1–10% by weight, based in each case on the total mass of the cycloolefin copolymer.

The COCs according to the invention have a solution viscosity (eta)$\geq$=0.25 dl/g (measured in decalin at 60° C. in accordance with DIN 51562), preferably from 0.25 to 1.5 dl/g. The molecular weight $M_w$ is preferably>13,000 g/mol and the polydispersity $M_w/M_n$ is preferably<4. The glass transition temperature is preferably –20°–200° C., particularly preferably 0°–200° C. The iodine number (IN) is 0.5–200, preferably 0.5–50.

The COCs according to the invention possess a good miscibility with other substances, which may be of low or high molecular weight. One example of low molecular weight mixing partners involves the use of the polymers according to the invention as an oil additive. Examples of high molecular weight substances are polymers, especially polyamides and polyacrylates.

The chemical reactivity of the functional groups can be exploited industrially in that, for example, dyes or biocides can be firmly attached to the otherwise inert polyolefin.

The COCs according to the invention exhibit very good adhesion properties and are suitable as coating compositions, which is of great industrial importance, for example, in the lamination of polymer sheets. In addition they can be used as additives in waxes, adhesives, coupling agents, plasticizers, sizes or textile finishing compositions or as curing agents, for example in reactive repair compositions.

The invention also relates to a process for the preparation of ene-functionalized COC which can be crosslinked in a controlled manner and has a solution viscosity (eta)$\geq$0.25 dl/g, which comprises reacting COC containing double bonds with at least one enophile.

The enophiles preferably used are $\alpha,\beta$-unsaturated carboxylic acids or $\alpha,\beta$-unsaturated carboxylic acid derivatives, such as maleic anhydride, maleic esters (e.g. di-n-butyl maleate and bisoctadecyl maleate), maleimides, which may also be substituted (e.g. N-phenylmaleimide), bromomaleic anhydride, sulfomaleic anhydride or diethyl azodicarboxylate.

The molar ratio of enophile to polymer double bonds is not critical. A less than equimolar ratio may be appropriate if the desire is to have as little unattached enophile as possible at the end of the reaction. However, in order to achieve maximum proportions of enophile attached to the polymer, it has proven advantageous to employ an excess of the enophile relative to the double bond, the upper limit being imposed by economic considerations and by any problems which may occur in separating off the excess component. The components are preferably reacted in a molar ratio of 2:8, particularly preferably 3:5.

The ene reaction can be catalyzed by Lewis acids.

The reaction can be carried out in heterogeneous or homogeneous form. A heterogeneous reaction is one in which the low molecular weight enophile acts as a vapor on the polymer particles, for example in a fluidized bed, or else in which the polymer particles are in suspension in a solution of the enophile.

A homogeneous reaction is carried out in the melt or in solution. In a preferred embodiment the reaction is carried out homogeneously in a solvent for COCs which also dissolves the enophile. Suitable solvents in this context are aromatic solvents such as benzene, toluene, xylenes and chlorobenzene, and other chlorinated organic solvents such as chloroform or tetrachloroethylene. Solvent mixtures may also often be advantageous. The reaction can advantageously be carried out under pressure. High-boiling components such as cis/transdecalin and isomers of dichlorobenzene are particularly suitable. In a preferred embodiment the reaction is carried out in 1,2-dichlorobenzene or decalin at temperatures of between 150° C. and 220° C. In a particularly preferred embodiment it is carried out at atmospheric pressure at the boiling point of the solution.

The upper concentration of the solution is limited by stirrability, i.e. the viscosity. The lower concentration limit results from economic considerations and the impurities which may be entrained by the solvent and which experience has shown possibly to lead, to an increased extent, to unwanted secondary reactions. The concentration range from 2–50% (w/v=polymer/solvent) has proven suitable. The preferred range is from 4–30%, particularly preferably from 5–20%.

In the preparation of the COC according to the invention the addition of a suitable inhibitor which is not chemically reactive under the chosen conditions may be advantageous. Examples of suitable such inhibitors are phenothiazine, nitroaromatic compounds such as nitrobenzene and dinitrobenzene, 2-mercaptobenzothiazole, 2-mercaptoimidazole and diphenylguanidine (U.S. Pat. No. 4,080,493). The COC according to the invention is preferably prepared in the absence of free-radical initiators such as peroxo compounds or azoisobutyronitrile.

The resulting polymer solution can be used further directly. If the polymer is to be isolated as such, it can be freed from solvent by the known methods:

1. Stripping off the solvent, for example by steam distillation,
2. Evaporating the solvent, for example by spray drying or thickening in a falling-film evaporator, which may be operated with a vacuum, and preferably by 3. Precipitating the polymer in a nonsolvent which is miscible with the polymer solvent, for example methanol or—particularly preferably—acetone.

Method 3 is preferred when the intention is to remove as much as possible of the enophile present in excess, for example maleic anhydride, from the reaction mixture.

By washing with solvents which do not dissolve the polymer it is readily possible to remove foreign substances such as by-products. Drying can be carried out at atmospheric pressure or reduced pressure, preferably with an inert gas blanket, in which case the temperature employed must be below $T_g$ in order to avoid sintering. Drying in a stream of nitrogen is preferred.

The cycloolefin copolymers which contain double bonds and are employed in the process according to the invention preferably contain 0.1–99.9% by weight of polymerized units of a cycloolefin of the formula I, II, III, IV, V, VI or VII

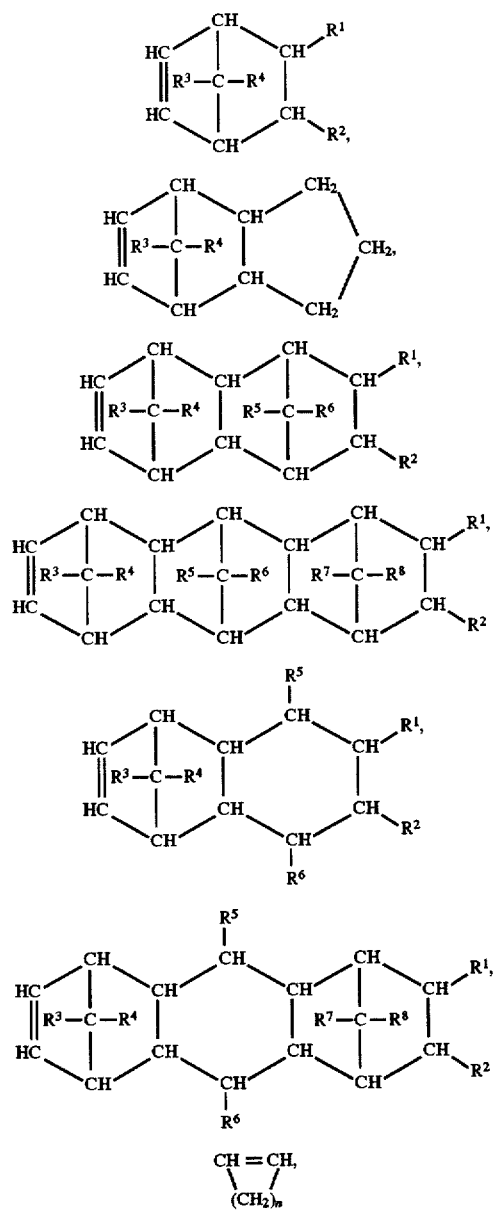

in which $R^1, R^2, R^3, R^4, R^5, R^6, R^7$ and $R^8$ are identical or different and are a hydrogen atom or a $C_1$–$C_{20}$ hydrocarbon radical such as a $C_1$–$C_8$-alkyl radical or $C_6$–$C_{14}$-aryl radical, it being possible for identical radicals to have different meanings in the various formulae I–VI, and n is a number from 2 to 10, and 0.1–99.9% by weight, based on the total mass of the cycloolefin copolymer, of polymerized units of at least one olefin which possess at least one double bond, preferably at least one olefin of the formulae VIII, IX, X, XI, XII and XIII

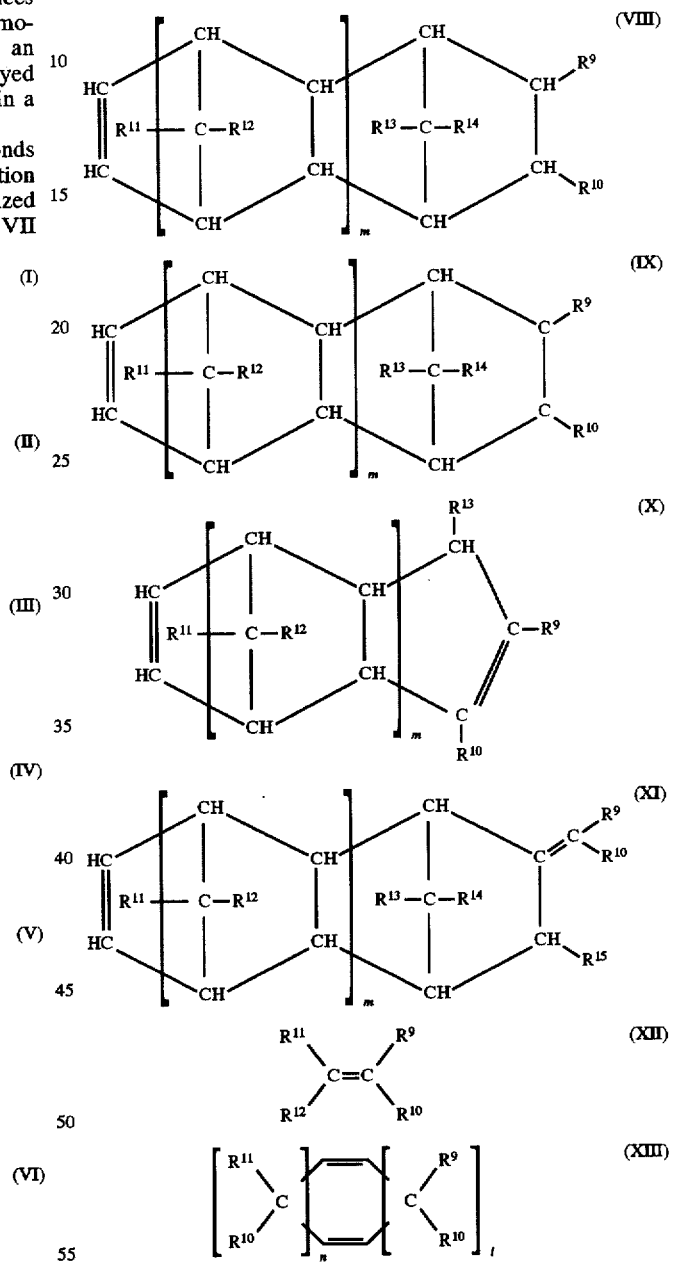

in which the radicals $R^9, R^{10}, R^{11}, R^{12}, R^{13}, R^{14}$ and $R^{15}$ are identical or different and are a hydrogen atom or a $C_1$–$C_{20}$ hydrocarbon radical such as $C_1$–$C_8$-alkyl, $C_6$–$C_{14}$-aryl or $C_3$–$C_{15}$-alkenyl, it being possible for identical radicals to have different meanings in the various formulae VIII–XIII, and at least one of the radicals $R^9, R^{10}, R^{11}, R^{12}, R^{13}$ and $R^{16}$ in formula VIII and $R^9, R^{10}, R^{11}$ and $R^{12}$ in formula XII is an alkenyl radical, and m is a number from 0 to 10, and n and l are each a number from 0 to 10, with the proviso that n=l=0 is not true, and 0–80% by weight, based on the total mass of the cycloolefin polymer, of polymerized units of at least one cyclic monoolefin, preferably an alpha-olefin of 2–20 carbon atoms, particularly preferably ethylene.

The cycloolefin copolymers which contain double bonds and are employed in the process according to the invention are prepared at temperatures of from −78°–200° C. and at a pressure of from 0.01–64 bar in the presence of a catalyst comprising an aluminoxane and at least one metallocene, preferably a metallocene of the formula (I) or (II)

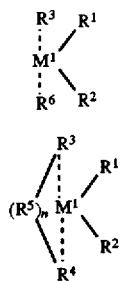

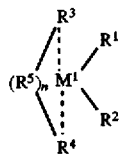

in which $M^1$ is a metal from the group consisting of titanium, zirconium, hafnium, vanadium, niobium and tantalum, $R^1$ and $R^2$ are identical or different and are a hydrogen atom, a halogen atom or a $C_1$–$C_{20}$ hydrocarbon group such as a $C_1$–$C_{10}$-alkyl group, a $C_6$–$C_{10}$-aryl group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^3$ and $R^4$ are identical or different and are a mono- or polycyclic hydrocarbon radical which is able to form a sandwich structure with the central atom, $R^5$ is

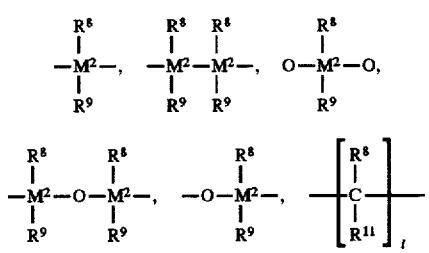

=$BR^8$, =$AlR^8$, —Ge—, —Sn—, —O—, —S—, =S=O, =$SO_2$, =$NR^8$, =$PR^8$ or =$P(O)R^8$, in which l=1, 2 or 3, $R^8$ and $R^9$ are identical or different and are a hydrogen atom, a halogen atom, or a $C_1$–$C_{20}$ hydrocarbon group such as a $C_1$–$C_{10}$-alkyl group, a $C_6$–$C_{10}$-aryl group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^8$ and $R^9$, in each case together with the atoms connecting them, form a ring system, $R^{11}$ is a halogen atom, or a $C_1$–$C_{20}$ hydrocarbon group such as a $C_1$–$C_{10}$-alkyl group, a $C_6$–$C_{10}$-aryl group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^8$ and $R^{11}$, in each case together with the atoms connecting them, form a ring system, and $M^2$ is silicon, germanium or tin.

Mono- or polycyclic hydrocarbon radicals are preferably unsubstituted or substituted cyclopentadienyl groups such as cyclopentadienyl, methylcyclopentadienyl, indenyl, 2-methylindenyl, 4,5-benzoindenyl, 2-methyl-4,5-benzoindenyl, fluorenyl or 4,7-tert-butylfluorenyl.

Preference is given to metallocenes of the formulae (I) and (II) in which $M^1$ is zirconium, $R^1$ and $R^2$ are identical and are a halogen atom, especially chlorine, or a $C_1$–$C_{10}$-alkyl group, especially methyl, $R^3$ and $R^4$ are identical or different and are cyclopentadienyl, indenyl or fluorenyl, which may be substituted by $C_1$–$C_{20}$ hydrocarbon radicals, $R^5$ is

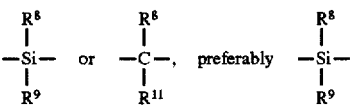

in which $R^8$, $R^9$ and $R^{11}$ are identical or different and are a $C_1$–$C_{10}$-alkyl group, especially methyl, or a $C_6$–$C_{10}$-aryl group, especially phenyl.

EXAMPLES

Definitions eta=solution viscosity (in decalin at 60° C. in accordance with DIN 51562) in dl/g, $M_w$=molecular weight in g/mol, $M_w/M_n$=polydispersity measured by gel permeation chromatography (o-dichlorobenzene, 135° C., polystyrene standard), Equivalent weight (EG)=g of polymer/mol of functional group (determined titrimetrically)

IN=iodine number (determined titrimetrically)

Example 1

A clean and dry 1.5 dm³ polymerization reactor with stirrer was flushed with nitrogen and then with ethylene and filled with 0.6 dm³ of an 85% strength solution of norbornene in toluene. 60 ml of 5-vinyl-2-norbornene were added. The ethylene pressure was adjusted to 6 bar gauge. 180 cm³ of hydrogen were also added and the temperature was adjusted to 70° C. 12 mg of diphenylmethylene (cyclopentadienyl)(9-fluorenyl)zirconium dichloride were dissolved in 20 cm³ of a solution of methylaluminoxane in toluene (10% by weight of methylaluminoxane of molecular mass 1300 g/mol by cryoscopic determination) and then the solution was metered into the reactor. By subsequent injection the ethylene pressure was maintained at 6 bar. After a polymerization time of one hour the reactor contents were run off into a vessel, and 5 cm³ of isopropanol were added.

10 g of Celite 545 (LuV, Hamburg) and 5 cm³ of water were added to the solution, which was stirred at 60° C. for 30 min. A filtercake consisting of 10 g of Celite suspended in 0.5 dm³ of toluene was built up on the filter mesh of a 2 l pressure suction filter. The polymer solution was filtered through the pressure suction filter, with a nitrogen pressure of about 1 bar being developed. The clear solution was introduced into 5 dm³ of acetone using a disperser (from Kotthoff). The solid was isolated by filtration, dispersed twice in acetone and then dried at 100° C. and under reduced pressure (0.2 bar) for 15 hours. 99 g of polymer solid was obtained. The glass transition temperature was 150° C. and eta was 0.3 dl/g (DIN 51562). An iodine number of 19 was found.

Examples 2 to 4

A number of cycloolefin copolymers (Table 1) were prepared in analogy to Example 1 but without the addition of hydrogen. The characteristics of the products are shown in Table 1.

TABLE 1

| Ex. No. | Diene monomer | Diene monomer [ml] | Metal-locene | Metallocene [mg] | Yield [g] | eta [dl/g] | $T_g$ [°C.] | Iodine No. |
|---|---|---|---|---|---|---|---|---|
| 2 | VNb | 60 | A | 12 | 84 | 0.68 | 156 | 15 |
| 3 | VNb | 30 | A | 12 | 106 | 1.13 | 168 | 10 |
| 4 | VNb | 30 | B | 11 | 21 | 0.88 | 161 | 9 |

VNb = 5-vinyl-2-norbornene,
A = diphenylmethylene(cyclopentadienyl) (9-fluorenyl)-zirconium dichloride
B = bis(indenyl)zirconium dichloride

Example 5

Analogously to Example 1 21.4 kg of norbornene, 6 dm$^3$ of toluene and 3 dm$^3$ of 5-vinyl-2-norbornene were placed in a 75 dm$^3$ polymerization reactor. 500 mg of catalyst A were dissolved in 500 cm$^3$ of a solution of methyl aluminoxane in toluene. 1.8 dm$^3$ of hydrogen were metered into the reactor and the ethylene pressure was adjusted to 6 bar. The catalyst solution was metered into the reactor. By subsequent injection the ethylene pressure was maintained at a constant level. During the polymerization a further 1.2 dm$^3$/h of hydrogen were metered in.

After a polymerization time of 1 h the reaction solution was run off into a 150 dm$^3$ stirred vessel which already contained 500 g of Celite and 200 ml of water in 50 dm$^3$ of a hydrogenated diesel oil fraction (Exxsol, boiling range 100°–120° C., from Exxon). The mixture was stirred at 60° C. for 30 min.

A filtercake of 500 g of Celite suspended in 10 dm$^3$ of Exxsol was built up on the filter mesh of a 120 dm$^3$ pressure suction filter. The polymer solution was filtered through the pressure suction filter. A nitrogen pressure of 2.8 bar was developed over the solution. The solution was then filtered through seven filter candles (Fluid Dynamics, Dynalloy SX 64, 5 µm, 0.1 m$^2$/candle) mounted in a steel housing. The polymer solution was stirred into 500 dm$^3$ of acetone using a disperser (®Ultra-Turrax) and the polymer precipitated. The suspension was circulated via a 680 dm$^3$ stirred pressure suction filter with an open bottom valve. The bottom valve was then closed and the product was washed three times with 200 dm$^3$ of acetone. After the final wash the product was dried initially in a stream of nitrogen at 100° C. and then dried in a drying oven at 0.2 bar for 24 hours. 4.8 kg of polymer were obtained. The solution viscosity (eta) was 0.52 dl/g and the glass transition temperature 153° C. The iodine number was 15. The weight-average molecular weight $M_w$ was 38,000 and the number-average molecular weight $M_n$ was 13,000.

Example 6

A compression-molded sheet (diameter 6 cm) was produced at 240° C. from 6 g of the polymer from Example 5. The sheet was transparent and colorless.

Example 7

5.033 g of the cycloolefin copolymer from Example 2, which contains 50 mol % of ethylene, 45 mol % of norbornene and 5 mol % of vinylnorbornene repeating units and is characterized by a solution viscosity (decalin, 135° C.) eta=0.68 dl/g and a molecular weight, determined by gel permeation chromatography (o-dichlorobenzene, 135° C.), $M_w$=17,000 g/mol with a polydispersity $M_w/M_n$=2.9; IN=15 (→EG=1700 g/mol C=C), $T_g$=156° C. (by DSC) are dissolved under nitrogen, together with 1.602 g of maleic anhydride, in 25 ml of 1,2-dichlorobenzene at room temperature. The solution is heated to 180° C. with stirring. After 8 h under reflux the batch is worked up by pouring it into 250 ml of acetone. The colorless maleinized polymer precipitated is filtered off with suction and washed repeatedly with acetone. The resulting polymer is dissolved in 150 ml of toluene containing 1.5 ml of acetic anhydride at 80° C. and reprecipitated in 700 ml of acetone. After drying at 60° C. in vacuum 4.928 g of polymer having an equivalent weight of 1450 g/mol C=C (IN=17.5) are obtained; $M_w$=17,800 g/mol, $M_w/M_n$=2.4; eta=0.61 dl/g. An equivalent weight of 3340 g/mol of anhydride is found by acidimetry. This method of determination is described in Polym. Eng. & Sci. 32, 467 (1992). The determination of anhydride by IR spectroscopy indicated the same content of attached maleic anhydride of 2.9% (w/w).

Example 8

Example 7 was repeated, but with reaction of 3.930 g of COC with 1.523 g of maleic anhydride in a, mixture of 25 ml of decalin (cis/trans mixture) and 2.5 ml of nitrobenzene at 190° C. over the course of 16 h. 3.425 g of a maleinized COC were obtained, having an equivalent weight of 2700 g/mol of C=C, an equivalent weight of 8500 g/mol of anhydride, and eta=0.62 dl/g.

Example 9

The procedure of Example 8 was followed but employing 4.8 g of a COC according to Example 4, having the characteristics eta=0.88 dl/g, $M_w$=11200 g/mol, D=$M_w/M_n$=1.8; IN=10 (→EG =2500 g/mol C=C, $T_g$=161° C. and containing 50 mol % of ethylene, 47 mol % of norbornene and 3 mol % of 5-vinylnorbornene repeating units.

4.766 g of a maleinized COC were obtained, having an equivalent weight of 1800 g/mol of C=C, an equivalent weight of 3500 g/mol of anhydride, and an eta=0.78 dl/g.

Example 10

The procedure of Example 8 was followed but the nitrobenzene was replaced by 100 mg of 2,6-di-tert-butyl-4-methylphenol. 3.52 g of a maleinized COC were obtained having an equivalent weight of 1180 g/mol of C=C (IN= 20.5), an equivalent weight of 2400 g/mol of anhydride, and an eta=0.49 dl/g.

Example 11

Example 10 was repeated on a scale larger by a factor of 10, but with a different initial polymer: eta=0.34 dl/g, $M_w$=37,900 g/mol, $M_w/M_n$=2.8; IN=15, i.e. EG=1690 g/mol C=C, $T_g$=153° C., this polymer containing 50 mol % of ethylene, 45 mol % of norbornene and 5 mol % of 5-vinylnorbornene repeating units.

Yields>90% (w/w) were obtained. eta=0.45 dl/g; IN=21-22. i.e. EG=1170-1230 g/mol C=C, EG=3000-4000 g/mol of anhydride.

Comparative Example A

The procedure of Example 11 was followed, but 21.2 g of the COC were dissolved together with 19.8 g (202 mmol) of maleic anhydride in 333 ml of toluene, and 1.125 g (6.85 mmol, 3.4 mol % with regard to double bond) of azoisobutyronitrile were added. A gel was obtained at 80° C. over the course of 80 min.

Example 12

An ene-maleinized COC (from Example 11) was dissolved in methylene chloride (20% w/v) and coated onto a glass surface using a doctor blade. The solvent was allowed to evaporate overnight and then, on the resulting polymer film, a contact angle of 85° (water), 75° (glycerol) and 66° (glycol) was measured (edge angle meter G1 from Krüss, Hamburg).

Comparative Example B

On a film prepared under the conditions of Example 12 from the nonfunctionalized COC of Example 2 a contact angle of 92° (water), 78° (glycerol) and 62° (glycol) was measured.

Example 13

The polymer film of Example 9 was treated with a saturated solution of the dye 1,2-diaminoanthraquinone in N-methylpyrrolidone (NMP) containing 1% (v/v) of pyridine. The temperature was raised from room temperature to 100° C. over the course of 60 min. The film was rinsed clear with cold NMP and hot water, and had a marked red coloration. The coloration could not be removed even by the action of dimethylformamide (DMF) at room temperature.

Comparative Example C

The polymer film from Comparative Example B was subjected to the coloring process described in Example 13. The resulting weak red coloration was removed completely with NMP.

Example 14

The COC from Example 3 was made up as a 0.5%, 5% and 10% by weight strength solution in decalin and dissolution was completed overnight with stirring. Half of each of the resulting solutions was carefully degassed and saturated with nitrogen. The second half of each solution was left in the original condition. Then all of the solutions in sealed glass vessels were suspended in a thertostatic device at an oil-bath temperature of 135° C., and the time taken until the first appearance of gel particles was observed. The highly concentrated degassed solution began to gel after 3 minutes. The solution of medium concentration required 8 minutes for gel formation, while the 0.5% strength sample exhibited gel particles after 13 minutes. Samples which had not been gassed required a time span which was longer by about 5 minutes before the first gels appeared.

We claim:

1. A cycloolefin copolymer having a solution viscosity>0.25 dl/g in decalin at 60° C., comprising components A) 0.1–99.89% by weight, based on the total mass of the cycloolefin copolymer, of polymerized units of at least one cycloolefin the formula I, II, III, IV, V, VI or VII

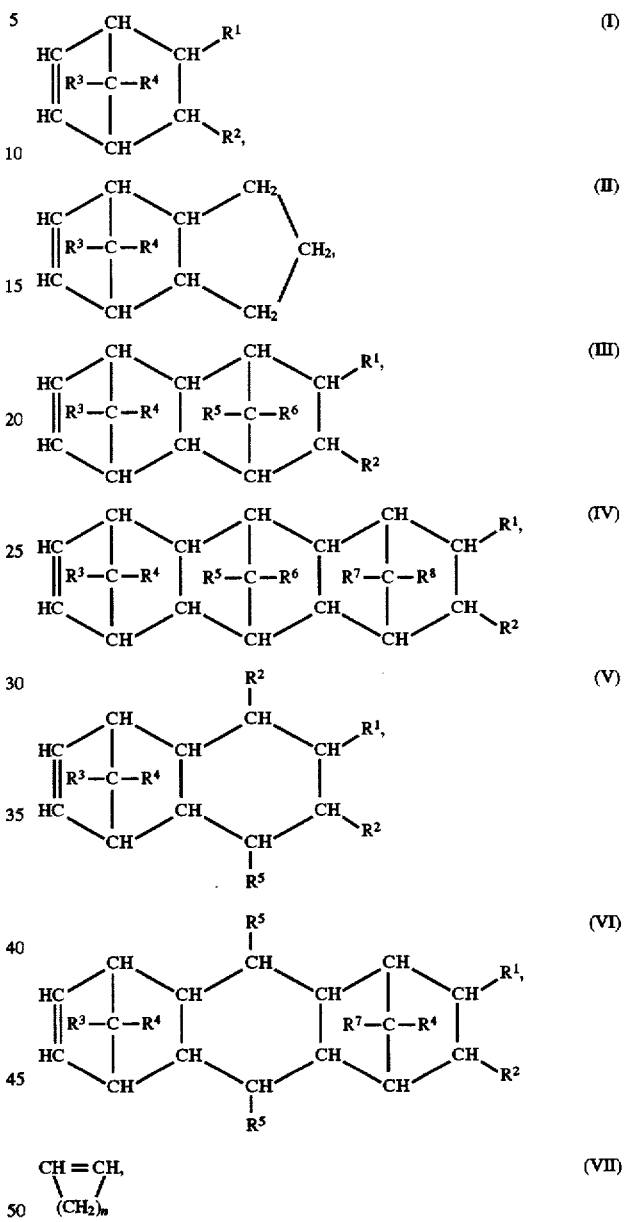

in which the radicals $R^1$, $R^2$, $R^3$, $R^4$, $R^5$, $R^6$, $R^7$ and $R^8$ are identical and are a hydrogen atom, or a $C_1$–$C_{20}$ hydrocarbon radical, or form a ring, it being possible for identical radicals to have different meanings in the various formulae I to VI, and n is a number from 2 to 10, B) 0.1–99.89% by weight, based on the total mass of the cycloolefin copolymer, of polymerized units of at least one olefin containing at least one double bond, wherein the equivalent weight with regard to olefinic double bonds is less than or equal to the number-average molecular weight, and is a compound of the formula VIII, IX, X, XI, XII or XIII

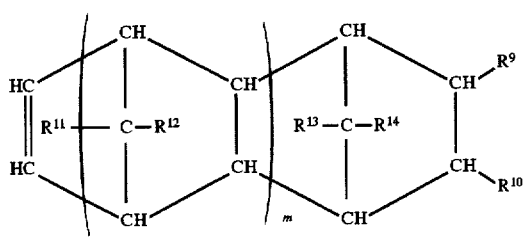
(VIII)

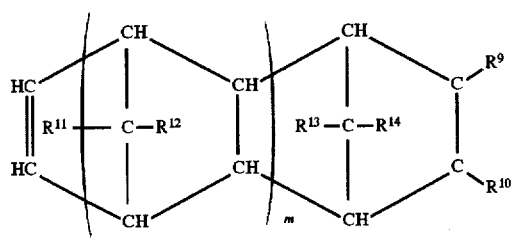
(IX)

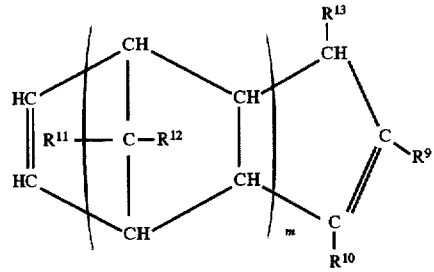
(X)

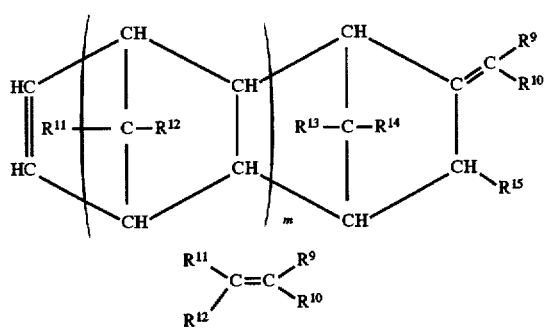
(XI)

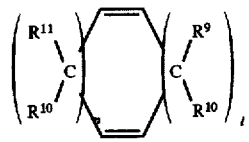
(XII)

(XIII)

in which $R^9$, $R^{10}$, $R^{11}$, $R^{12}$, $R^{13}$, $R^{14}$ and $R^{15}$ are identical or different and are a hydrogen atom, $C_1$–$C_8$-alkyl, $C_6$–$C_{14}$-aryl or $C_3$–$C_{15}$-alkenyl, with it being possible for identical radicals to have different meanings in the various formulae VIII–XIII, and at least one of the radicals $R^9$, $R^{10}$, $R^{11}$, $R^{12}$, $R^{13}$ and $R^{15}$ in formula VIII and $R^8$, $R^{10}$, $R^{11}$ and $R^{12}$ in formula XII is a $C_3$–$C_{15}$-alkenyl radical, and m is a number from 0 to 10, and n and l are each a number from 0 to 10, with the proviso that n and l can not be 0 at the same time.

C) 0–80% by weight, based on the total mass of the cycloolefin copolymer, of polymerized units of at least alpha olefins of 2 to 20 carbon atoms, and D) 0.01 to 50% by weight, based on the total mass of the cycloolefin copolymer, of polymerized units which possess at least two electron-withdrawing groups which are carbonyl or nitrile and said copolymer has a polydispersity ($M_w/M_n$) from 1.8 to 2.8.

2. A cycloolefin copolymer having a solution viscosity greater than or equal to 0.25 dl/g in decalin at 60° C., consisting essentially of A) 10 to 90% by weight norbornene or tetracyclodiodecane, B) 2 to 30% by weight dienes of from 4–20 carbon atoms which contains at least one double bond wherein the equivalent weight with regard to olefinic double bonds is less than or equal to the number-average molecular weight and is at least one compound of the formula VIII, IX, X, XI, XII or XIII

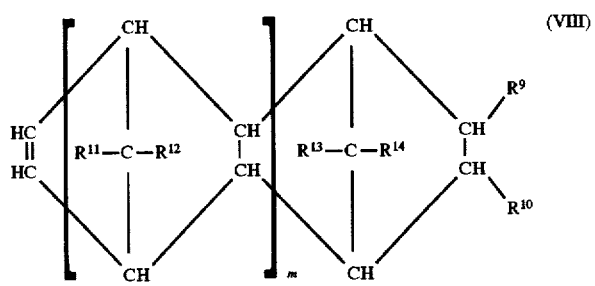
(VIII)

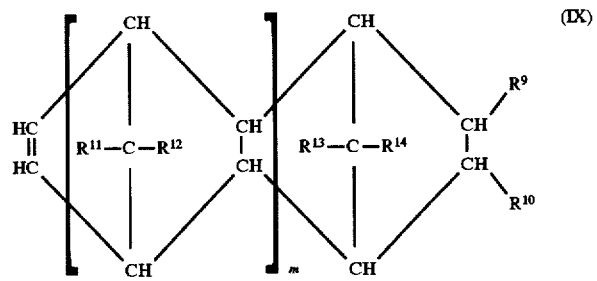
(IX)

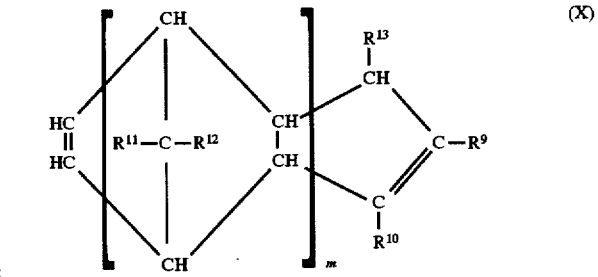
(X)

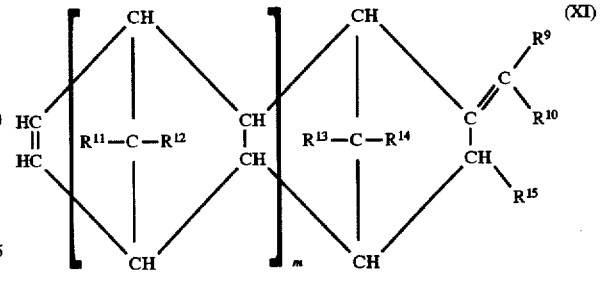
(XI)

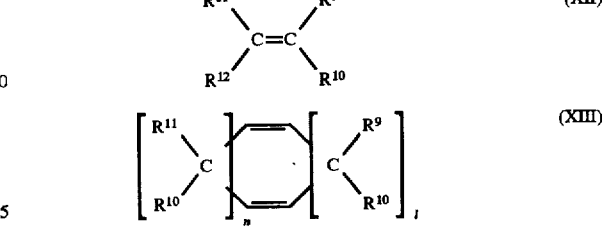
(XII)

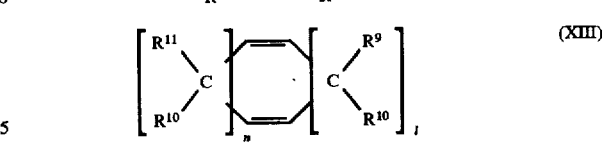
(XIII)

in which $R^9$, $R^{10}$, $R^{11}$, $R^{12}$, $R^{13}$, $R^{14}$ and $R^{15}$ are identical or different and are a hydrogen atom, $C_1$–$C_8$-alkyl, $C_6$–$C_{14}$-aryl or $C_3$–$C_{15}$-alkenyl, with it being possible for identical radicals to have different meanings in the various formulae VIII–XIII, and at least one of the radicals $R^9$, $R^{10}$, $R^{11}$, $R^{12}$, $R^{13}$ and $R^{16}$ in formulae VIII and $R^9$, $R^{10}$, $R^{11}$ and $R^{12}$ in formula XII is a $C_3$–$C_{15}$-alkenyl radical, and m is a number from 0 to 10, and n and 1 are each a number from 0 to 10, with the proviso that n and 1 can not be 0 at the same time.

C) 2 to 50% by weight ethylene or propylene and

D) 0.1 to 10% by weight carbonyl or nitrile, and said copolymer has
  1) a polydispersity ($M_w/M_n$) from 1.8 to 2.8,
  2) a glass transition temperature from 0° C. to 200° C.,
  3) an iodine number from 0.5 to 50 and
  4) a molecular weight $M_w$ from 11,200 to 38,000 g/mol.

3. A cycloolefin copolymer having a solution viscosity greater than or equal to 0.25 dl/g in decalin at 60° C., consisting essentially of
  a copolymer which consists essentially of
  A) 10 to 90% by weight norbornene or tetracyclodiodecane,
  B) 2 to 30% by weight dienes of from 4–20 carbon atoms which contains at least one double bond wherein the equivalent weight with regard to olefinic double bonds is less than or equal to the number-average molecular weight and is at least one compound of the formula VIII, IX, X, XI, XII or XIII

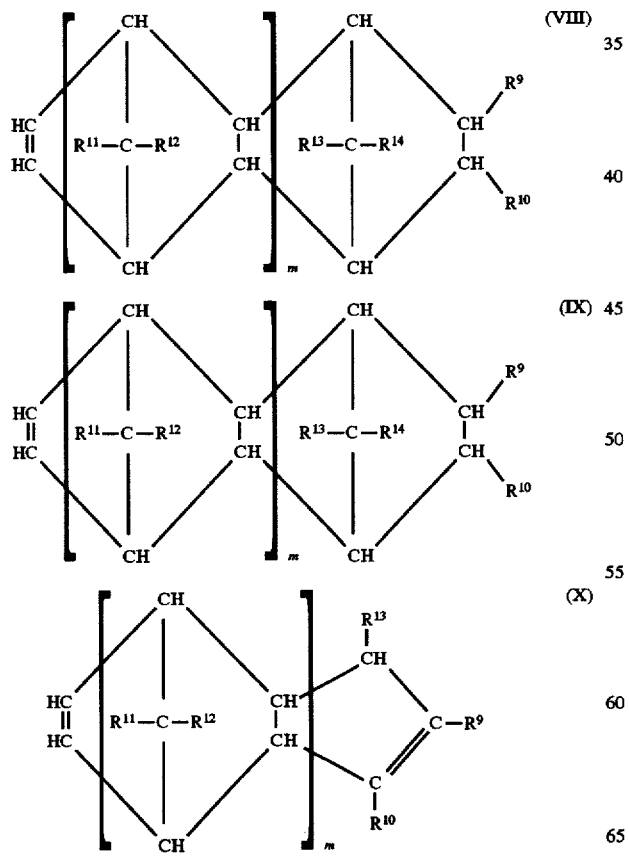

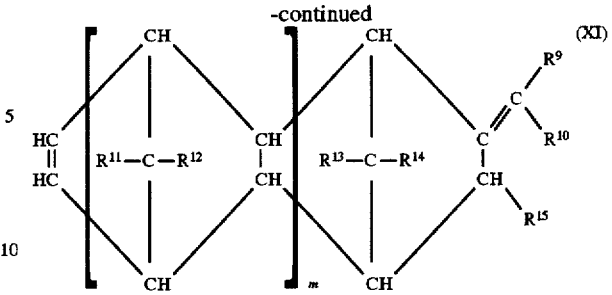

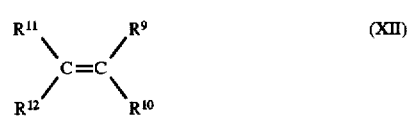

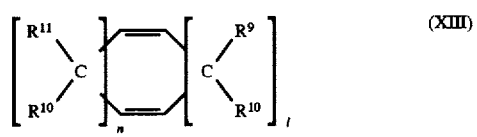

in which $R_9$, $R^{10}$, $R^{11}$, $R^{12}$, $R^{13}$, $R^{14}$ and $R^{15}$ are identical or different and are a hydrogen atom, $C_1$–$C_6$-alkyl, $C_6$–$C_{14}$-aryl or $C_3$–$C_{16}$-alkenyl, with it being possible for identical radicals to have different meanings in the various formulae VIII–XIII, and at least one of the radicals $R^9$, $R^{10}$, $R^{11}$, $R^{12}$, $R^{13}$ and $R^{16}$ in formulae VIII and $R^9$, $R^{10}$, $R^{11}$ and $R^{12}$ in formula XII is a $C_3$–$C_{15}$-alkenyl radical, and m is a number from 0 to 10, and n and 1 are each a number from 0 to 10, with the proviso that n and 1 can not be 0 at the same time and C) 2 to 50% by weight ethylene or propylene and D) 0.1 to 10% by weight of carbonyl or nitrile and said copolymer has
  1) a polydispersity ($M_w/M_n$) from 1.8 to 2.8,
  2) a glass transition temperature from 0° C. to 200° C.,
  3) an iodine number from 0.5 to 50 and
  4) a molecular weight $M_w$ from 11,200 to 38,000 g/mol.

4. A cycloolefin copolymer having a solution viscosity>0.25 dl/g in decalin at 60° C., comprising
  a copolymer having the following components:
  A) 0.1–99.89% by weight, based on the total mass of the cycloolefin copolymer, of polymerized units of at least one cycloolefin of the formula I, II, III, IV, V, VI or VII

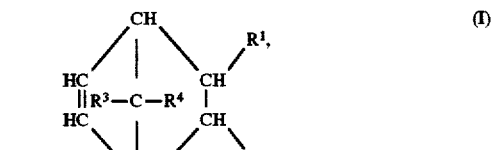

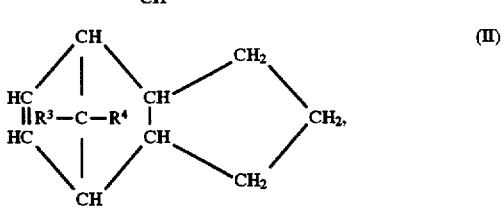

-continued

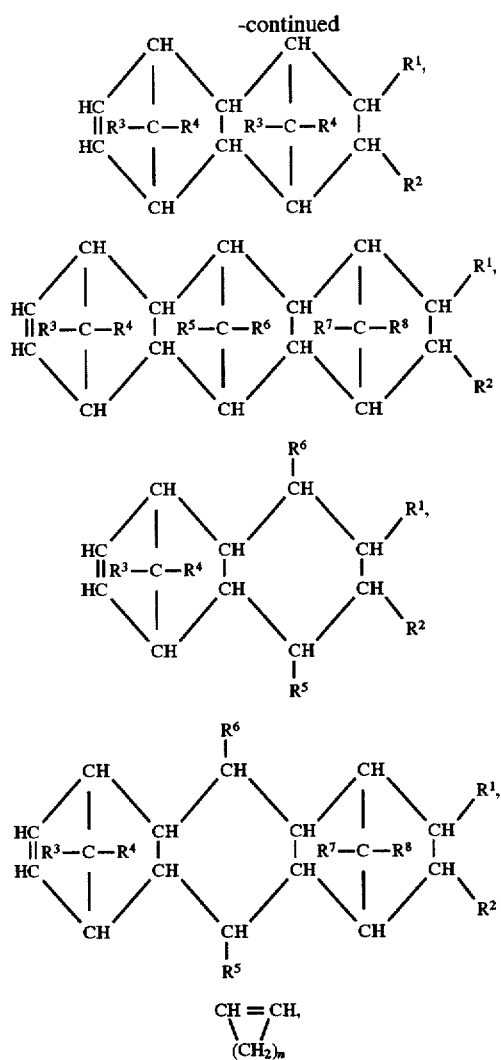

in which the radicals $R^1$, $R^2$, $R^3$, $R^4$, $R^5$, $R^6$, $R^7$ and $R^8$ are identical and are a hydrogen atom, or a $C_1$–$C_{20}$ hydrocarbon radical, or form a ring, it being possible for identical radicals to have different meanings in the various formulae I to VI, and n is a number from 2 to 10, B) 0.1–99.89% by weight, based on the total mass of the cycloolefin copolymer, of polymerized units of at least one olefin containing at least one double bond, wherein the equivalent weight with regard to olefinic double bonds is less than or equal to the number-average molecular weight, and is at least one compound of the formula VIII, IX, X, XI, XII or XIII

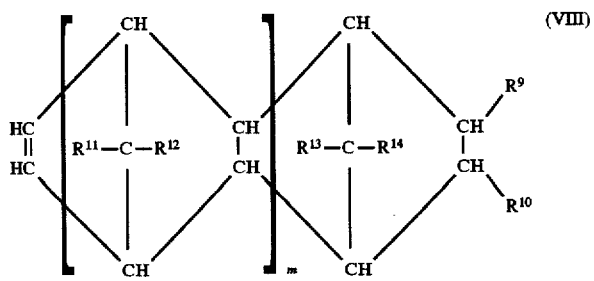

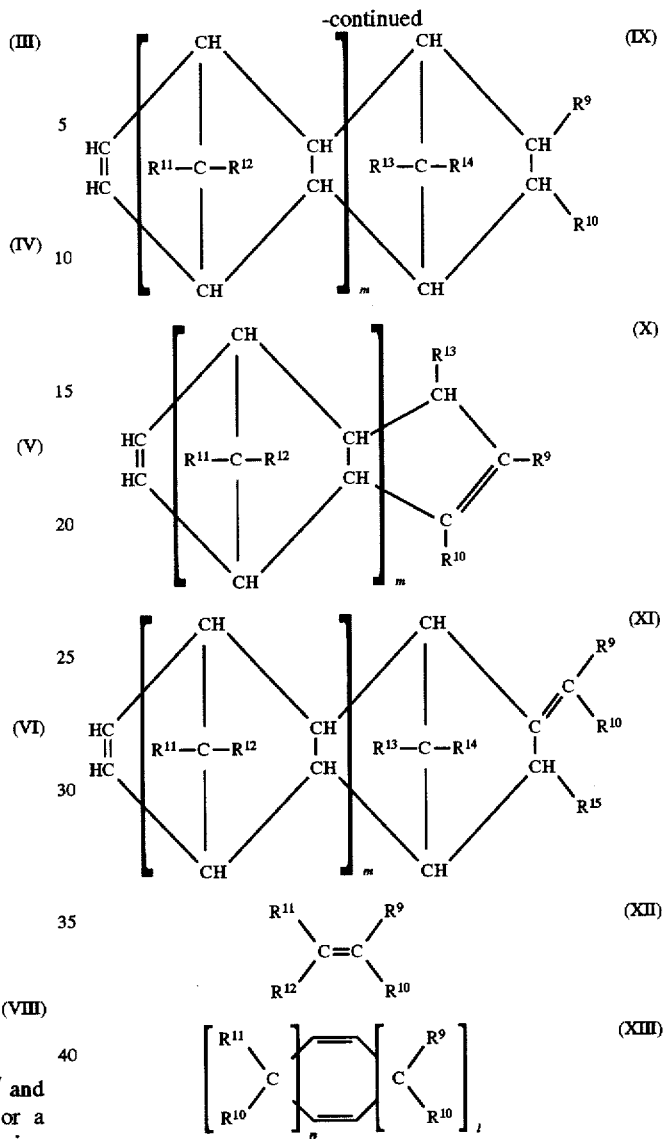

in which $R^9$, $R^{10}$, $R^{11}$, $R^{12}$, $R^{13}$, $R^{14}$ and $R^{15}$ are identical or different and are a hydrogen atom, $C_1$–$C_8$-alkyl, $C_6$–$C_{14}$-aryl or $C_3$–$C_{15}$-alkenyl, with it being possible for identical radicals to have different meanings in the various formulae VIII–XIII, and at least one of the radicals $R^9$, $R^{10}$, $R^{11}$, $R^{12}$, $R^{13}$ and $R^{16}$ in formula VIII and $R^9$, $R^{10}$, $R^{11}$ and $R^{12}$ in formula XII is a $C_3$–$C_{15}$-alkenyl radical, and m is a number from 0 to 10, and n and l are each a number from 0 to 10, with the proviso that n and l can not be 0 at the same time and C) 0–80% by weight, based on the total mass of the cycloolefin copolymer, of polymerized units of at least alpha olefins of 2 to 20 carbon atoms, and D) at least two electron withdrawing groups to said copolymer wherein the cycloolefin copolymer contains 0.01 to 50% by weight, based on the total mass of the cycloolefin copolymer, of polymerized units which possess at least two electron-withdrawing groups which are carbonyl or nitrile and said copolymer has a polydispersity ($M_w/M_n$) from 1.8 to 2.8.

5. The cycloolefin copolymer as claimed in claim 2, wherein the copolymer contains from 0.1 to 10% by weight of carbonyl.

6. The cycloolefin copolymer as claimed in claim 1, wherein component D is carbonyl.

7. The cycloolefin copolymer as claimed in claim 1, wherein said cycloolefin copolymer is prepared in the presence of a catalyst comprising an aluminoxane and at least one metallocene and said cycloolefin copolymer which contain double bonds react with at least one enophile selected from the group consisting of α,β-unsaturated carboxylic acids and α,β-unsaturated carboxylic acid derivatives.

8. The cycloolefin copolymer as claimed in claim 7, wherein said metallocene contains a metal selected from the group consisting of titanium, zirconium, hafnium, niobium and tantalum.

9. The cycloolefin copolymer as claimed in claim 8, wherein said enophile is maleic anhydride, maleic esters, maleimides, which are also may optionally be substituted, bromomaleic anhydride, sulfomaleic anhydride or azo azodicarboxylate.

10. A cycloolefin copolymer as claimed in claim 1, wherein the polymerized units B) contain at least 0.1% by weight, based on the total mass of the cycloolefin copolymer, of an acyclic $C_4$–$C_{20}$ polyene.

11. A coating composition comprising at least one cycloolefin copolymer as claimed in claim 1.

12. A copolymer as claimed in claim 1, wherein the polycyclic olefin A) is norbornene.

13. A copolymer as claimed in claim 1, wherein the polycyclic olefin A) is tetracyclododecane.

14. A copolymer as claimed in claim 1, wherein the olefinic polymerized units B) are dienes of from 4–20 carbon atoms.

15. A copolymer as claimed in claim 1, wherein the alpha-olefins are ethylene and propylene.

16. A copolymer as claimed in claim 1, wherein the electron withdrawing unit is carbonyl.

17. A copolymer as claimed in claim 1, wherein the units A) are present in an amount of 1–99% by weight;

the units B) are present in an amount of 1–50% by weight, the units C) are present in an amount of 1–60% by weight, and the units D) are present in an amount of 0.05–20% by weight.

18. A copolymer as claimed in claim 1, wherein the units A) are present in an amount of 10–90% by weight;

the units B) are present in an amount of 2–30% by weight, the units C) are present in an amount of 2–50% by weight, and the units D) are present in an amount of 0.1–10% by weight.

19. The copolymer as claimed in claim 1, wherein the polymerized units A) are norbornene or tetracyclodiodecane, the polymerized units B) are dienes of from 4–20 carbon atoms, the polymerized units C) are ethylene or propylene and the polymerized units D) are carbonyl or nitrile and wherein the polydispersity ($M_w/M_n$) of the copolymer is less than 4.

20. The cycloolefin copolymer as claimed in claim 19, wherein the copolymer has a viscosity from 0.25 to 1.5 dl/g, a polydispersity from 1.8 to 2.8, a glass temperature from −20° C. to 200° C. and an iodine number from 0.5 to 200.

21. The copolymer as claimed in claim 20, wherein the glass temperature range is from 0° to 200° C. and the iodine number is from 0.5 to 50.

22. The copolymer as claimed in claim 19, wherein the polydispersity ($M_w/M_n$) of the copolymer is from 1.8 to 2.8 and the molecular weight $M_w$ of the copolymer is from 11,200 g/mol to 38,000 g/mol.

* * * * *